United States Patent
Misra et al.

(10) Patent No.: US 9,817,814 B2
(45) Date of Patent: Nov. 14, 2017

(54) INPUT ENTITY IDENTIFICATION FROM NATURAL LANGUAGE TEXT INFORMATION

(71) Applicant: Accenture Global Solutions Limited, Dublin (IE)

(72) Inventors: Janardan Misra, Bangalore (IN); Neville Dubash, Mumbai (IN); Sanjay Podder, Thane (IN); Divya Rawat, Dehradun (IN)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 15/050,908

(22) Filed: Feb. 23, 2016

(65) Prior Publication Data

US 2017/0192958 A1    Jul. 6, 2017

(30) Foreign Application Priority Data

Dec. 31, 2015   (IN) .......................... 7125/CHE/2015

(51) Int. Cl.
*G06F 17/27* (2006.01)
*G06F 17/30* (2006.01)

(52) U.S. Cl.
CPC ........ *G06F 17/2785* (2013.01); *G06F 17/278* (2013.01); *G06F 17/30616* (2013.01); *G06F 17/30657* (2013.01)

(58) Field of Classification Search
CPC ................. G06F 17/241; G06F 17/243; G06F 17/30017; G06F 17/3002; G06F 17/30026; G06F 17/30029; G06F 17/30038; G06F 17/30047; G06F 17/30265; G06F 17/30619; G06F 17/30637; G06F 17/30876; G06F 17/30879; Y10S 707/90933; Y10S 707/99942; Y10S 707/917; Y10S 707/99934; Y10S 707/99936; Y10S 707/99943; G06K 9/00; G06K 9/00442
USPC .............................. 707/736, 769, 917, 955, 707/999.002–999.004; 715/210, 256, 715/230, 255, 708; 704/8, 9, 4, 10, 6, 704/257
See application file for complete search history.

(56) References Cited

U.S. PATENT DOCUMENTS

| | | | |
|---|---|---|---|
| 6,732,090 B2 * | 5/2004 | Shanahan | G06F 17/30011 707/999.003 |
| 6,820,075 B2 * | 11/2004 | Shanahan | G06F 17/3064 707/769 |
| 6,980,949 B2 | 12/2005 | Ford | |
| 7,284,191 B2 * | 10/2007 | Grefenstette | G06F 17/30867 715/230 |

(Continued)

*Primary Examiner* — Vijay B Chawan
(74) *Attorney, Agent, or Firm* — Harrity & Harrity, LLP

(57) ABSTRACT

A device may include one or more processors. The device may receive text to be processed to identify input entities included in the text. The device may identify text sections of the text. The device may generate a list of terms included in the text sections of the text. The device may perform one or more feature extraction techniques, on the terms included in the text sections, to identify the input entities included in the text. The device may generate information that identifies the input entities included in the text, based on performing the one or more feature extraction techniques. The device may provide the information that identifies the input entities included in the text.

20 Claims, 10 Drawing Sheets

(56) References Cited

U.S. PATENT DOCUMENTS

| | | | | |
|---|---|---|---|---|
| 7,818,215 B2* | 10/2010 | King | ............ | H04N 1/00244 |
| | | | | 704/8 |
| 8,219,557 B2* | 7/2012 | Grefenstette | ....... | G06F 17/3061 |
| | | | | 707/736 |
| 8,515,828 B1 | 8/2013 | Wolf et al. | | |
| 9,201,868 B1 | 12/2015 | Zhang et al. | | |
| 2003/0033287 A1* | 2/2003 | Shanahan | ......... | G06F 17/30011 |
| | | | | 707/999.003 |
| 2003/0033288 A1* | 2/2003 | Shanahan | ........... | G06F 17/3064 |
| | | | | 707/999.003 |

* cited by examiner

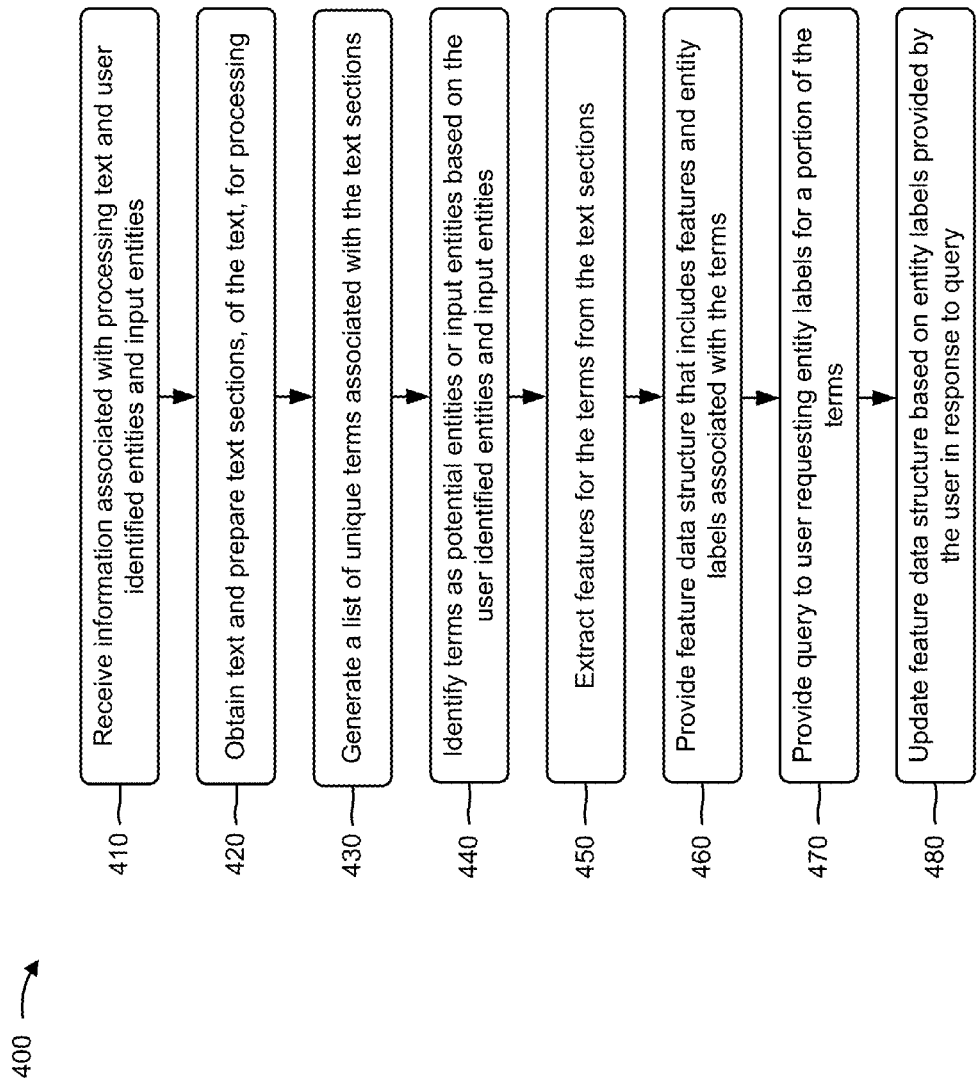

710 → *Registration system shall allow users to enter details of invoice receipt date.*

| Term | Features | | | | |
|---|---|---|---|---|---|
| | POS tag (F1) | POS pattern (F2) | Is Capitalized (F3) | Headword (F4) | Number of words (F5) |
| Registration_system | NN_NN | T | T | system | 2 |
| shall | MD | F | F | shall | 1 |
| allow | VB | F | F | allow | 1 |
| users | NNS | T | F | users | 1 |
| to | TO | F | F | to | 1 |
| enter | VB | F | F | enter | 1 |
| details | NNS | T | F | details | 1 |
| of | IN | F | F | of | 1 |
| invoice_receipt_date | NN_NN_NN | T | F | date | 3 |

FIG. 7A

710 → *Registration system shall allow users to enter details of invoice receipt date.*

720

| Term | Features | | | | | | | |
|---|---|---|---|---|---|---|---|---|
| | F6 | F7 | F8 | F9 | Surrounding context (F10) | POS of surrounding context (F11) | Label | Conf. |
| Registration_system | 0 | 0 | 0 | 0 | {shall, allow} | {MD, VB} | notAnEntity | 0.5 |
| shall | 0 | 0 | 0 | 0 | {registration_system, allow, users} | {DT_NN_NN, VB, NNS} | notAnEntity | 0.8 |
| allow | 0 | 0 | 0 | 0 | *** | *** | InputTypeEntity | 0.95 |
| users | 0 | 0.72 | 0.83 | 1 | *** | *** | notAnEntity | 0.9 |
| to | 0 | 0 | 0 | 0 | *** | *** | notAnEntity | 1 |
| enter | 0 | 0 | 0 | 0 | *** | *** | notAnEntity | 1 |
| details | 1 | 0.59 | 0 | 1 | *** | *** | notAnEntity | 0.98 |
| of | 0 | 0 | 0 | 0 | *** | *** | notAnEntity | 0.87 |
| invoice_receipt_date | 1 | 0.59 | 0 | 3 | *** | *** | InputTypeEntity | 0.7 |

FIG. 7B

INPUT ENTITY IDENTIFICATION FROM NATURAL LANGUAGE TEXT INFORMATION

RELATED APPLICATION

This application claims priority to Indian Patent Application No. 7125/CHE/2015, filed on Dec. 31, 2015, the content of which is incorporated by reference herein in its entirety.

BACKGROUND

Text documents may include information associated with entities, such as named entities (e.g., people, organizations, or the like). For example, a requirements document may specify phrases that refer to entities for which functional test data is to be generated. Such entities may be referred to as input-type entities or input entities. In system requirements, input entities may refer to concepts of the system that accept data (e.g., inputs) for an external operating environment (e.g., a user).

Identification of entities in project documentation (e.g., requirement specifications) serving specialized functions is often a manually time intensive and complex process that occurs before software design, development, and testing may begin. For example, identification of input entities in the system requirements is difficult since input entities may include a precise meaning with respect to the system, which may be implicitly referred in the system requirements.

SUMMARY

According to some possible implementations, a device may include one or more processors. The one or more processors may receive text to be processed to identify input entities included in the text. The one or more processors may identify text sections of the text. The one or more processors may generate a list of terms included in the text sections of the text. The one or more processors may perform one or more feature extraction techniques, on the terms included in the text sections, to identify the input entities included in the text. The one or more feature extraction techniques may include a technique to determine tag patterns for the terms based on tags associated with the terms. The one or more feature extraction techniques may include a technique to determine whether the terms are capitalized. The one or more feature extraction techniques may include a technique to determine a headword in each term than includes multiple words. The one or more feature extraction techniques may include a technique to determine a number of constituent words in each term. The one or more feature extraction techniques may include a technique to determine whether each term is an object of an action. The one or more feature extraction techniques may include a technique to determine semantic similarities of input type actions acting on the terms. The one or more feature extraction techniques may include a technique to determine semantic similarities of non-input type actions acting on the terms. The one or more feature extraction techniques may include a technique to determine a distance of each term from an action appearing in a same text section associated with each term. The one or more feature extraction techniques may include a technique to identify surrounding context for each term and associated tags with the surrounding context. The one or more processors may generate information that identifies the input entities included in the text, based on performing the one or more feature extraction techniques. The one or more processors may provide the information that identifies the input entities included in the text.

According to some possible implementations, a computer-readable medium may store one or more instructions that, when executed by one or more processors, may cause the one or more processors to receive text to be processed to identify input entities included in the text. The one or more instructions, when executed by one or more processors, may cause the one or more processors to identify text sections of the text. The one or more instructions, when executed by one or more processors, may cause the one or more processors to generate a list of terms included in the text sections of the text. The one or more instructions, when executed by one or more processors, may cause the one or more processors to perform a plurality of feature extraction techniques, on the terms included in the text sections, to identify the input entities included in the text. The one or more instructions, when executed by one or more processors, may cause the one or more processors to generate information that identifies the input entities included in the text, based on performing the plurality of feature extraction techniques. The one or more instructions, when executed by one or more processors, may cause the one or more processors to provide the information that identifies the input entities included in the text.

According to some possible implementations, a method may include receiving, by a device, text to be processed to identify input entities included in the text. The method may include identifying, by the device, text sections of the text. The method may include generating, by the device, a list of terms included in the text sections of the text. The method may include performing, by the device, one or more feature extraction techniques, on the terms included in the text sections, to identify the input entities included in the text. The one or more feature extraction techniques may include determining tag patterns for the terms based on tags associated with the terms. The one or more feature extraction techniques may include determining whether the terms are capitalized. The one or more feature extraction techniques may include determining a headword in each term than includes multiple words. The one or more feature extraction techniques may include determining a number of constituent words in each term. The one or more feature extraction techniques may include determining whether each term is an object of an action. The one or more feature extraction techniques may include determining semantic similarities of input type actions acting on the terms. The one or more feature extraction techniques may include determining semantic similarities of non-input type actions acting on the terms. The one or more feature extraction techniques may include determining a distance of each term from an action appearing in a same text section associated with each term. The one or more feature extraction techniques may include identifying surrounding context for each term and associating tags with the surrounding context. The method may include generating, by the device, information that identifies the input entities included in the text, based on performing the one or more feature extraction techniques. The method may include providing, by the device, the information that identifies the input entities included in the text.

BRIEF DESCRIPTION OF THE DRAWINGS

FIG. 4 is a flow chart of an example process for identifying input entities from natural language text information;

FIGS. 7A and 7B are diagrams of example implementations relating to the example process shown in FIG. 6.

DETAILED DESCRIPTION

The following detailed description of example implementations refers to the accompanying drawings. The same reference numbers in different drawings may identify the same or similar elements.

A text document, such as a requirements document, may include one or more text sections, such as plain text, annotated text (e.g., text with terms, tags associated with the terms, etc.), or the like. In a requirements document, the text sections may describe one or more requirements for use in system design and development. A requirement may include an explanation of a desired property of a system. Analysis of a text that includes requirements or other information may include identifying named entities or generic entities (e.g., noun phrases), but not input entities. In some cases, such entity identification may be performed manually. However, manual identification of entities may be dependent on user knowledge of the information, may involve excessive manual work, may be error-prone, or the like. Implementations described herein may utilize natural language processing and continuous machine learning to identify input entities (e.g., phrases that refer to entities for which functional test data is to be generated) included in text, thereby increasing the speed and accuracy of input entity identification.

Figure 1:
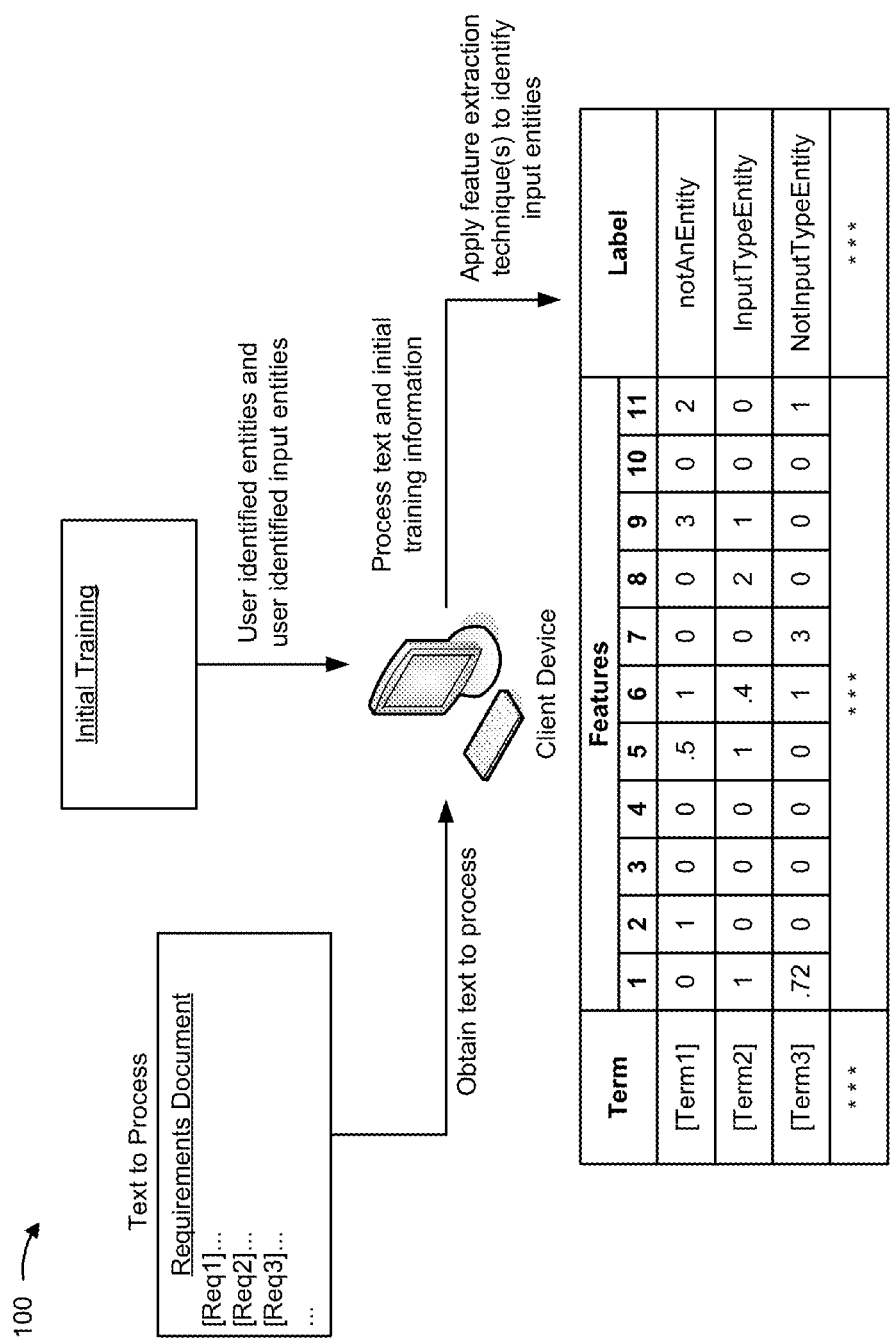
FIG. 1 is a diagram of an overview of an example implementation described herein.

FIG. 1 is a diagram of an overview of an example implementation 100 described herein. As shown in FIG. 1, a client device (e.g., a desktop computer, a laptop computer, etc.) may obtain text to be processed to identify input entities included in the text. For example, assume that the text is a requirements document that includes various requirements, identified as [Req1], [Req2], [Req3], etc. As further shown, the client device may receive initial training information from a user of the client device. The initial training information may include, for example, user identified entities (e.g., named entities, generic entities, or the like), user identified input entities (e.g., phrases that refer to entities for which functional test data needs to be generated), or the like.

As further shown in FIG. 1, the client device may process the text and the initial training information, and apply feature extraction technique(s) to identify input entities included in the text. As an example, the client device may prepare text sections, of the text, for processing, and may generate a list of unique terms associated with the text sections. The client device may identify terms as potential entities or input entities based on the user identified entities and input entities, and may extract features for the terms from the text sections. The client device may provide, for display, a feature data structure that includes the features and entity labels, determined based on the features, associated with the terms. In some implementations, the client device may provide a query to the user requesting entity labels for a portion of the terms, and may update the feature data structure based on entity labels provided by the user in response to the query. These and other feature extraction techniques are described in more detail elsewhere herein. In this way, the client device may assist in identifying input entities included in the text, which may save time by eliminating manual processing of the text, may result in more accurate input entity identification, or the like. In some cases, a user may use the identified input entities to assist in different phases of a software development process, such as a testing phase (e.g., by reducing time required to generate functional test data), a design phase (e.g., by reducing time required to identify system components), or the like. Furthermore, the feature extraction techniques may reduce computer processing resources since the techniques automate identification of input entities in natural language text.

In example implementation 100, requirements are used as an example. In practice, the client device may identify input entities in text sections that do not include requirements, or may identify input entities in a text document other than a requirements document, as described in more detail elsewhere herein.

Figure 2:
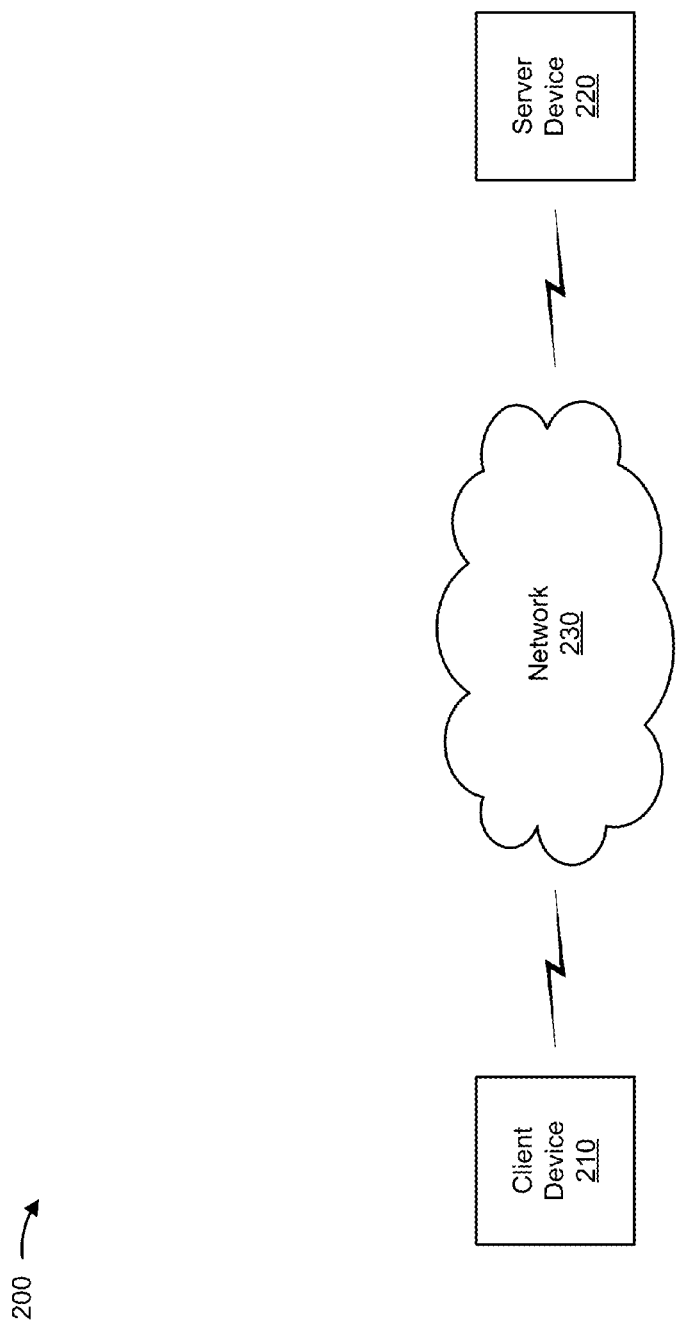
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include one or more devices capable of receiving, generating, storing, processing, and/or providing text and/or information associated with text (e.g., a text section included in the text, a term included in the text, a tag for a term included in the text, an input entity included in the text, a term glossary, etc.). For example, client device 210 may include a computing device, such as a desktop computer, a laptop computer, a tablet computer, a server device, a mobile phone (e.g., a smart phone, a radiotelephone, etc.), or a similar device. In some implementations, client device 210 may receive text to process to identify input entities included in the text, and may process the text to identify the input entities. Client device 210 may utilize one or more extraction techniques to identify the input entities included in the text. In some implementations, client device 210 may receive information from and/or transmit information to server device 220 (e.g., text and/or information associated with text).

Server device 220 may include one or more devices capable of receiving, generating, storing, processing, and/or providing text and/or information associated with text. For example, server device 220 may include a computing device, such as a server device, a desktop computer, a laptop computer, a tablet computer, or a similar device. Server device 220 may perform one, more, or all operations described elsewhere herein as being performed by client device 210.

Network 230 may include one or more wired and/or wireless networks. For example, network 230 may include a public land mobile network (PLMN), a local area network (LAN), a wide area network (WAN), a metropolitan area network (MAN), a telephone network (e.g., the Public Switched Telephone Network (PSTN)), a cellular network, a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
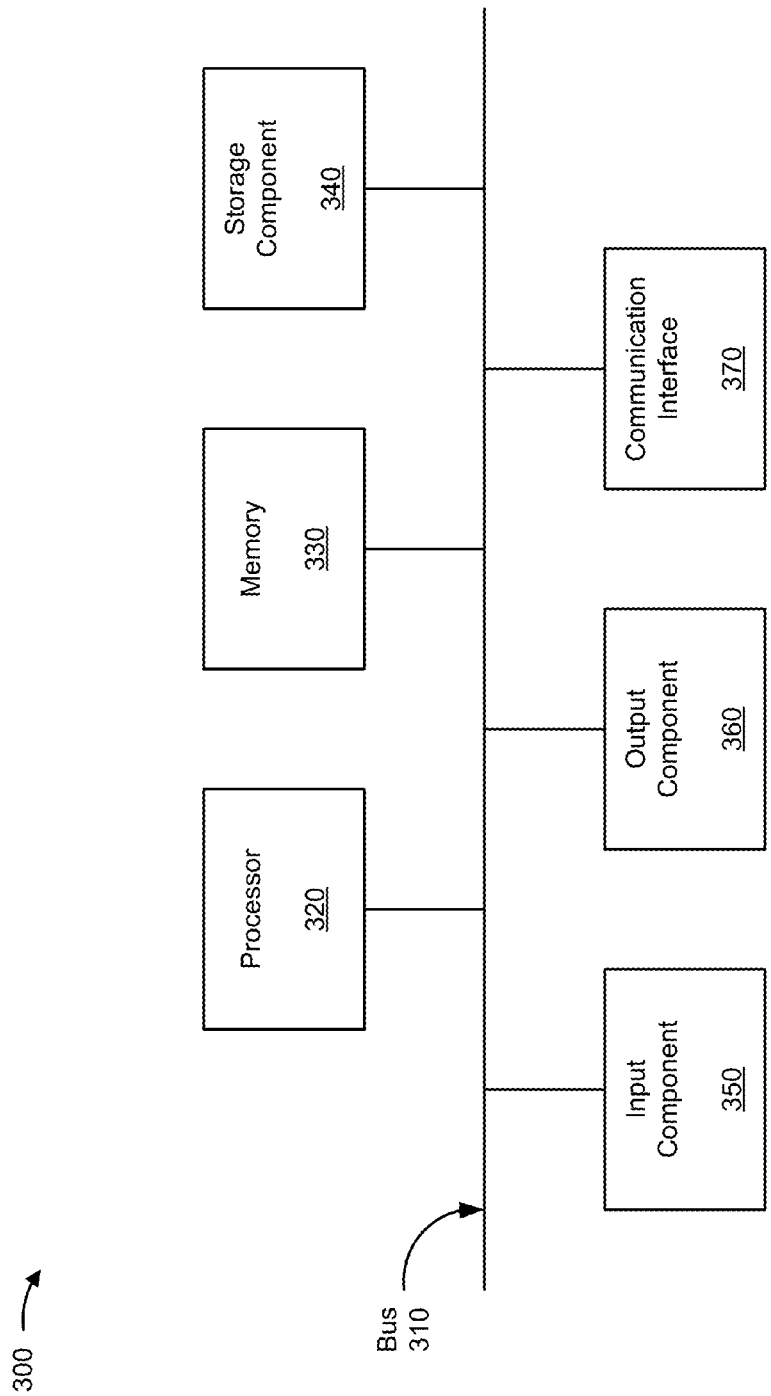
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for identifying input entities from natural language text information. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving information associated with processing text and user identified entities and input entities (block 410). For example, client device 210 may receive information that identifies text to be processed, may receive user provided information that identifies entities to be used to identify input entities included in the text, may receive user provided information that identifies input entities to be used to identify input entities included in the text, may receive information associated with a feature extraction technique to be used to extract features from the text sections included in the text and utilize the features to identify input entities, or the like. In some implementations, a text section may include one or more requirements relating to the development or design of a system (e.g., a software program, a hardware system, a device, a product, a service, etc.), one or more sentences of the text, one or more words of the text, or the like.

Client device 210 may receive, via input from a user and/or another device, information that identifies text to be processed. For example, a user may input information identifying the text or a memory location at which the text is stored (e.g., local to and/or remote from client device 210). The text may include, for example, a document that includes text (e.g., a text file, a text document, a file that includes text and other information, such as images, etc.), a group of documents that include text (e.g., multiple files), a portion of a document that includes text (e.g., a portion indicated by a user, a portion identified by document metadata, etc.), and/or other information that includes text. In some implementations, client device 210 may receive an indication of one or more sections of text to be processed.

The text may include one or more terms. A term may refer to a set of characters, such as a single character, multiple characters (e.g., a character string), a combination of characters (e.g., in a particular order) that form a word, a combination of characters that form multiple words (e.g., a multi-word term, such as a phrase, a sentence, a paragraph, etc.), a combination of characters that form an acronym, a combination of characters that form an abbreviation of a word, a combination of characters that form a misspelled word, etc.

In some implementations, client device 210 may receive, via input from a user and/or another device, information and/or instructions that identify entities to be used to identify input entities included in the text. For example, client device 210 may receive a list that identifies entities (e.g., generic entities, noun entities, or the like) to be used to identify input entities in the text. As another example, client device 210 may receive a list (e.g., a glossary that identifies entities in the text, a dictionary that includes entity definitions, a thesaurus that includes entity synonyms or antonyms, a lexical database, such as WordNet, etc.) that identifies entities in the text (e.g., single-word entities, multi-word entities, etc.).

In some implementations, client device 210 may receive, via input from a user and/or another device, information and/or instructions that identify input entities to be used to identify input entities included in the text. For example, client device 210 may receive a list that identifies input entities to be used to identify input entities in the text. As another example, client device 210 may receive a list (e.g., a glossary that identifies input entities in the text, a dictionary that includes input entity definitions, a thesaurus that includes input entity synonyms or antonyms, a lexical database, such as WordNet, etc.) that identifies input entities in the text (e.g., single-word input entities, multi-word input entities, etc.).

As further shown in FIG. 4, process 400 may include obtaining the text and preparing text sections, of the text, for processing (block 420). For example, client device 210 may obtain the text, and may prepare the text for processing to identify input entities included in the text. In some implementations, a user may input information identifying the text or a memory location at which the text is stored. Based on the user input, client device 210 may retrieve the text. Additionally, or alternatively, client device 210 may provide a user interface via which a user may input text, and client device 210 may obtain the text based on the information input via the user interface. The text may include multiple files storing text, a single file storing text, a portion of a file storing text, multiple lines of text, a single line of text, a portion of a line of text, etc. The text may include untagged text and/or may include tagged text, which refers to text that has been annotated with one or more tags.

In some implementations, client device 210 may determine text sections, of the text, to be processed. For example, client device 210 may determine a manner in which the text is to be partitioned into text sections, and may partition the text into the text sections. A text section may include, for example, a sentence, a line, a paragraph, a page, a document, etc. Additionally, or alternatively, a text section may correspond to a requirement (e.g., in a requirements document) and/or may include a requirement. In some implementations, client device 210 may label text sections (e.g., may label a text section as a requirement), and may use the labels when processing the text. Additionally, or alternatively, client device 210 may process each text section separately (e.g., serially or in parallel).

Client device 210 may prepare the text (e.g., one or more text sections) for processing, in some implementations. For example, client device 210 may standardize the text to prepare the text for processing. In some implementations, preparing the text for processing may include adjusting characters, such as by removing characters, replacing characters, adding characters, adjusting a font, adjusting formatting, adjusting spacing, removing white space (e.g., after a beginning quotation mark; before an ending quotation mark; before or after a range indicator, such as a hyphen, a dash, a colon, etc.; before or after a punctuation mark, such as a percentage sign, etc.), or the like. For example, client device 210 may replace multiple spaces with a single space, may insert a space after a left parenthesis, a left brace, a left bracket, etc., may insert a space before a right parenthesis, a right brace, a right bracket, etc. In this way, client device 210 may use a space delimiter to more easily parse the text.

In some implementations, client device 210 may prepare the text for processing by mapping different types of characters (e.g., left brackets, such as {, [, (, <, and right brackets, such as },], ), and >) to a single type of character (e.g., a left parenthesis '(' and a right parenthesis ')', respectively).

In some implementations, client device 210 may prepare the text for processing by expanding acronyms included in the text. For example, client device 210 may replace a short-form acronym, in the text, with a full-form term that the acronym represents (e.g., may replace "EPA" with "Environmental Protection Agency"). Client device 210 may determine the full-form term of the acronym by, for example, using a glossary or other input text, searching the text for consecutive words with beginning letters that correspond to the acronym (e.g., where the beginning letters "ex" may be represented in an acronym by "X") to identify a potential full-form term of an acronym, by searching for potential full-form terms that appear near the acronym in the text (e.g., within a threshold quantity of words), by performing an Internet search where possible full-form terms are presented to the user for selection of a correct term. or the like.

In some implementations, client device 210 may prepare the text for processing by determining whether the text sections include the user defined entities and/or input entities. In some implementations, client device 210 may determine whether one or more user defined entities and/or input entities provide an exact string match with terms in the text sections. In some implementations, client device 210 may determine whether one or more user defined entities and/or input entities provide an acronym match with terms in the text sections. For example, assume that a user defined entity is "AN" and that the text section includes "To proceed with registration user should enter account number." In such an example, the term "account number" may be an acronym match with the user defined entity "AN." If there are more than one acronym matches across text sections and user defined entities and/or input entities, the user may need to resolve such conflicts. In some implementations, client device 210 may determine whether one or more user defined entities and/or input entities provide a fuzzy match with terms in the text sections. For example, assume that "accont numbr" is a user defined entity and that a text section includes "To proceed with registration user should enter account number." In such an example, the user defined entity "accont numbr" may be a fuzzy match with the term "account number."

In some implementations, client device 210 may prepare the text for processing by applying phrase encoding for the user identified entities. In some implementations, if a text section includes one or more user defined entities, words of a matched phrase in the text section may be grouped together using a coding scheme. For example, assume the text section includes "Registration system shall allow users to enter details of invoice receipt date." In such an example, "Registration system" and "users" may be matched entities. For a multi-word entity, such as "registration system," coding may be applied by replacing spaces with "_" so that the multi-word entity becomes "registration_system."

In some implementations, client device 210 may prepare the text for processing by marking user identified input entities in the text sections. In such implementations, a user identified input entity may not be input type in all the text sections, and, therefore, such user identified input entities may be marked per text section.

In some implementations, client device 210 may prepare the text for processing by applying phrase encoding for the user identified input entities. In some implementations, if a text section includes one or more user defined input entities, words of a matched phrase in the text section may be grouped together using a coding scheme. For example, assume the text section includes "Registration system shall allow users to enter details of invoice receipt date." In such an example, "invoice receipt date" may be a matched input entity. For a multi-word input entity, such as "invoice receipt date," coding may be applied by replacing spaces with "_" so that the multi-word input entity becomes "invoice_receipt_date."

As further shown in FIG. 4, process 400 may include generating a list of unique terms associated with the text sections (block 430). For example, client device 210 may generate a list of unique terms associated with the text sections. The list of unique terms (e.g., a term corpus) may refer to a set of terms (e.g., single word terms, multi-word terms, etc.) extracted from the text. In some implementations, the term corpus may include terms tagged with a noun tag and/or a tag derived from a noun tag (e.g., an entity tag applied to words with successive noun tags, a term tag, etc.). For example, client device 210 may receive information that identifies one or more tags, and may associate the tags with terms in the text based on tag association rules. The tag association rules may specify a manner in which the tags are to be associated with the terms, based on characteristics of the terms. For example, a tag association rule may specify that a singular noun tag ("/NN") is to be associated with terms that are singular nouns (e.g., based on a language database, a context analysis, etc.).

Additionally, or alternatively, the term corpus may include terms identified based on input provided by a user (e.g., input that identifies multi-word terms; input that identifies a pattern for identifying multi-word terms, such as a pattern of consecutive words associated with particular part-of-speech tags, a pattern of terms appearing at least a threshold quantity of times in the text; etc.), which may tagged with a term tag in some implementations. Additionally, or alternatively, the term corpus may include terms extracted from section headings of the text.

In some implementations, client device 210 may receive information that identifies stop tags or stop terms. The stop tags may identify tags associated with terms that are not to be included in the list of unique terms. Similarly, the stop terms may identify terms that are not to be included in the list of unique terms. When generating the list of unique terms, client device 210 may only add terms to the list that are not associated with a stop tag or identified as a stop term (e.g., "the," "a," "an," or the like).

Additionally, or alternatively, client device 210 may convert terms to a root form when adding the terms to the list of unique terms. For example, the terms "processes," "processing," "processed," and "processor" may all be converted to the root form "process." Similarly, the term "devices" may be converted to the root form "device." Thus, when adding terms to the list of unique terms, client device 210 may convert the terms "processing device," "processed devices," and "processor device" into the root form "process device." Client device 210 may add the root term "process device" to the list of unique terms.

Client device 210 may generate a term corpus by generating a data structure that stores terms extracted from the text, in some implementations. For example, client device 210 may generate a list of terms TermList of size t (e.g., with t elements), where t is equal to the number of unique terms in the text (e.g., where unique terms list TermList=[term$_1$, term$_2$, . . . , term$_t$]). Additionally, or alternatively, client device 210 may store, in the data structure, an indication of an association between a term and a tag associated with the term.

As further shown in FIG. 4, process 400 may include identifying terms as potential entities or potential input entities based on the user identified entities and/or input entities (block 440). For example, client device 210 may identify terms as potential entities or potential input entities based on the user identified entities and/or input entities. In some implementations, for each sentence of each text section, client device 210 may identify noun phrases as potential entities or potential input entities. In such implementations, the noun phrases may be extracted from the text sections based on a chunking process, such as, for example, an OpenNLP chunking process.

In some implementations, the noun phrases may be grouped together using a coding scheme. For example, assume the text section includes "Registration system shall allow users to enter details of invoice receipt date." In such an example, "Registration system," "users," and "invoice receipt date" may be identified as noun phrases, and may be marked for the coding scheme. For multi-word noun phrases, such as "registration system" and "invoice receipt date," coding may be applied by replacing spaces with "_" so that the multi-word noun phrases become "registration_system" and "invoice_receipt_date." The identified noun phrases may be considered potential candidates for being either entities or input entities.

As further shown in FIG. 4, process 400 may include extracting features for the terms from the text sections (block 450). For example, client device 210 may extract features for the terms from the text sections. In some implementations, client device 210 may utilize a part-of-speech (POS) tagging process on each sentence of the text sections in order to extract a feature (e.g., a first feature, referred to herein as F1) for the terms; may determine whether the terms satisfy particular POS tag patterns (e.g., regular expression tag patterns) in order to extract a feature (e.g., a second feature, referred to herein as F2) for the terms; may determine whether the terms are capitalized in order to extract a feature (e.g., a third feature, referred to herein as F3) for the terms; may determine a headword for each multi-word term in order to extract a feature (e.g., a fourth feature, referred to herein as F4) for the terms; may determine constituent words in each multi-word term in order to extract a feature (e.g., a fifth feature, referred to herein as F5) for the terms; may determine constituent words in each multi-word term in order to extract a feature (e.g., a fifth feature, referred to herein as F5) for the terms; may determine whether a term is an object of an action in order to extract a feature (e.g., a sixth feature, referred to herein as F6) for the terms; may determine a latent semantic similarity of each term with input type actions in order to extract a feature (e.g., a seventh feature, referred to herein as F7) for the terms; may determine a latent semantic similarity of each term with non-input type actions in order to extract a feature (e.g., an eighth feature, referred to herein as F8) for the terms; may determine a distance of each term from an action term in order to extract a feature (e.g., a ninth feature, referred to herein as F9) for the terms; may determine a surrounding context for each term in order to extract a feature (e.g., a tenth feature, referred to herein as F10) for the terms; may apply POS tags to the surrounding context of each term in order to extract a feature (e.g., an eleventh feature, referred to herein as F11) for the terms; or the like. Further details of feature extraction are provided elsewhere herein, and, in particular, in connection with FIG. 6.

As further shown in FIG. 4, process 400 may include providing a feature data structure that includes the features for the terms and entity labels associated with the terms (block 460). For example, client device 210 may generate a feature data structure that includes the extracted features for the terms and entity labels associated with the terms. In some implementations, the feature data structure may include a feature matrix that includes a column identifying the terms of the text sections, columns identifying features extracted for the terms, a column identifying entity labels (e.g., not an entity, not an input entity, input entity, or the like), a column identifying confidence levels (e.g., determined based on the extracted features) associated with the entity labels, and multiple rows associated with the columns. In some implementations, the "not an entity" label may be associated with terms that do not refer to an entity in reference to a system being described in the text. In some implementations, the "not an input entity" label may be associated with terms that refer to entities, which are not input entities in reference to the system being described in the text. In some implementations, the "input entity" label may be associated with terms that refer to input entities in reference to the system being described in the text.

In some implementations, client device 210 may store the feature matrix in a memory associated with client device 210. In some implementations, client device 210 may provide the feature matrix for display to a user of client device 210. The feature matrix may enable the user to view and/or verify input entities identified in the text by client device 210.

In some implementations, client device 210 may generate a training file based on the feature matrix, including the terms associated with the entity labels (e.g., input entity, non-input entity, not an entity, or the like), and a model may be trained based on the training file. In some implementations, a classification technique may be used for training the model using the feature matrix. In such implementations, a format of the feature matrix may be changed to accommodate the classification technique. In some implementations, client device 210 may utilize a machine learning model, such as a conditional random fields model, a margin infused relaxed algorithm model, a support vector machines model, or the like. In some implementations, client device 210 may utilize the model to identify input entities in new text (e.g., a new requirements document) provided to client device 210.

As further shown in FIG. 4, process 400 may include requesting, or providing a query to the user requesting, entity labels for a portion of the terms (block 470). For example, client device 210 may provide a query to the user requesting entity labels for a portion of the terms in the text. In some implementations, client device 210 may display a user interface that includes information requesting the user to provide entity labels for the portion of the terms in the text. For example, the user interface may include text sections associated with the portion of the terms, the portion of the terms, assigned entity labels for the portion of the terms, and locations for the user to provide entity labels for the portion of the terms.

In some implementations, client device 210 may request entity labels for terms associated with entity labels that include confidence levels that do not satisfy a particular threshold. For example, assume that a new requirements document is received by client device 210. In such an example, client device 210 may query the user for a correct entity label for a term whenever a confidence level of the entity label, generated by client device 210 for the term, is below a particular threshold. For example, if the confidence level of the entity label is high (e.g., a distance between an entity class boundary and the term may be large), client device 210 may assign the generated entity label to the term. Alternatively, if the confidence level of the entity label is low (e.g., the distance between the entity class boundary and the term may be very small), client device 210 may request that the user provide the entity label.

In some implementations, the particular threshold may include an uncertainty range of values. For example, the uncertainty range may be selected as follows. Assume that N>1 is the number of entity labels and p is the confidence level of a term label. If p satisfies the constraint, $$\frac{1}{N} \leq p \leq \left(\frac{1}{N} + \varepsilon\right),$$

where $$0 < \varepsilon < \frac{1}{N^2},$$

then p may be within the uncertainty range, and client device 210 may query the user for a correct entity label for the term. Thus, if N=3, then the uncertainty range may include a range of 0.33 (e.g., ⅓) to 0.44 (e.g., ⅘). In some implementations, client device 210 may rank terms within uncertainty range in an increasing order of confidence levels p, and may select a number (X=10%) of the terms to be presented to the user as a query. Client device 210 may present each text section, associated with each of the selected terms, to the user with a request to label noun-phrases present in each text section. For example, assume that "registration_details" is one of the selected terms due to a confidence level assigned to the entity label associated with "registration_details." Further, assume that the selected term appears in the text section "System should allow admin to edit user_address for registration_details." In such an example, client device 210 may request that the user assign entity labels to the terms "user address" and "registration details."

As further shown in FIG. 4, process 400 may include updating the feature data structure based on entity labels provided by the user (block 480). For example, client device 210 may update the feature data structure based on entity labels provided by the user (e.g., in response to the query). In some implementations, client device 210 may receive the entity labels from user via the user interface displayed to the user, as described above. For example, the user may provide entity labels for the portion of the terms via the user interface, and client device 210 may receive the user provided entity labels. In one example, assume that client device 210 requests that user assign entity labels to the terms "user address" and "registration details" in the text section "System should allow admin to edit user_address for registration_details." Further, assume that the user assigns "input entity" labels to the terms "user address" and "registration details." In such an example, client device 210 may receive the user assigned "input entity" labels for the terms.

In some implementations, client device 210 may update portions of the feature matrix based on the user responses to the query (e.g., the user provided entity labels for the text sections). In some implementations, client device 210 may add the updated portions of the feature matrix to the training file to generate an updated training file, and may generate an updated model based on the updated training file. In some implementations, when new information is received, client device 210 may repeat the interactive learning until a particular performance threshold for the model is satisfied.

In some implementations, client device 210 may calculate a performance of the model based on a number of terms included within the uncertainty range. For example, the performance may be calculated based on a precision (P) and a recall (R) associated with input entity classifications by the model. A total number (W1) of terms correctly labeled as input entities may be determined according to: W1=A−(B+C), where A may refer to a total number of input entities identified in the text, B may refer to a number of times an input entity is labeled as not an entity, and C may refer to a number of times an input entity is labeled as a non-input entity. A total number (W2) of terms labeled as input entities may be determined according to: W2=D+E+F, where D may refer to a number of terms correctly labeled as input entities, E may refer to a number of times a non-input entity is labeled as an input entity, and F may refer to a number of times not an entity is labeled as an input entity. The precision (P) associated with input entity classifications by the model may be determined according to P=W1/W2, and the recall (R) associated with input entity classifications by the model may be determined according to R=W1/Z, where Z may refer to a total number of input entities in the text.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
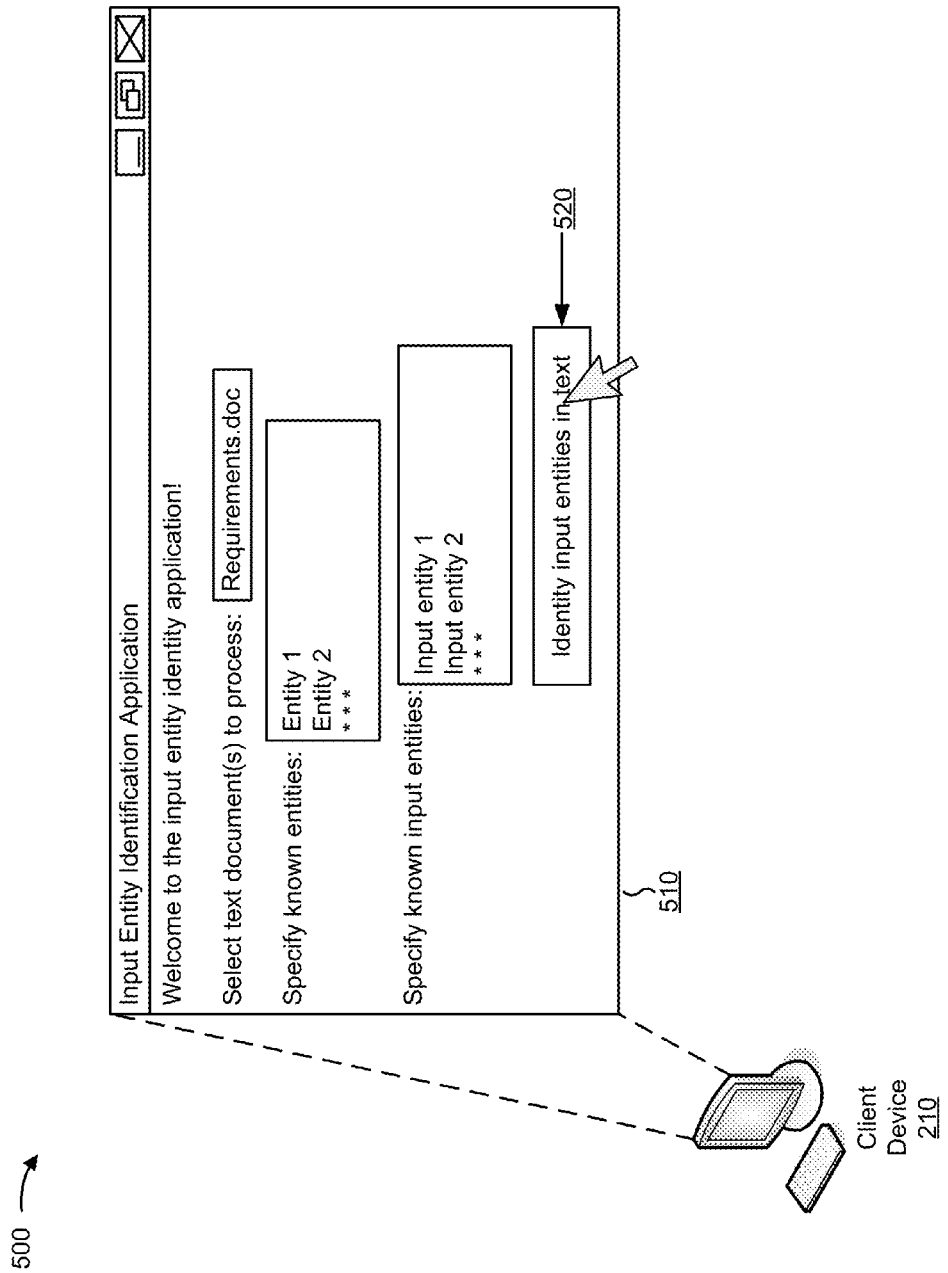
FIGS. 5A-5C are diagrams of an example implementation relating to the example process shown in FIG. 4.
Figure 5B:
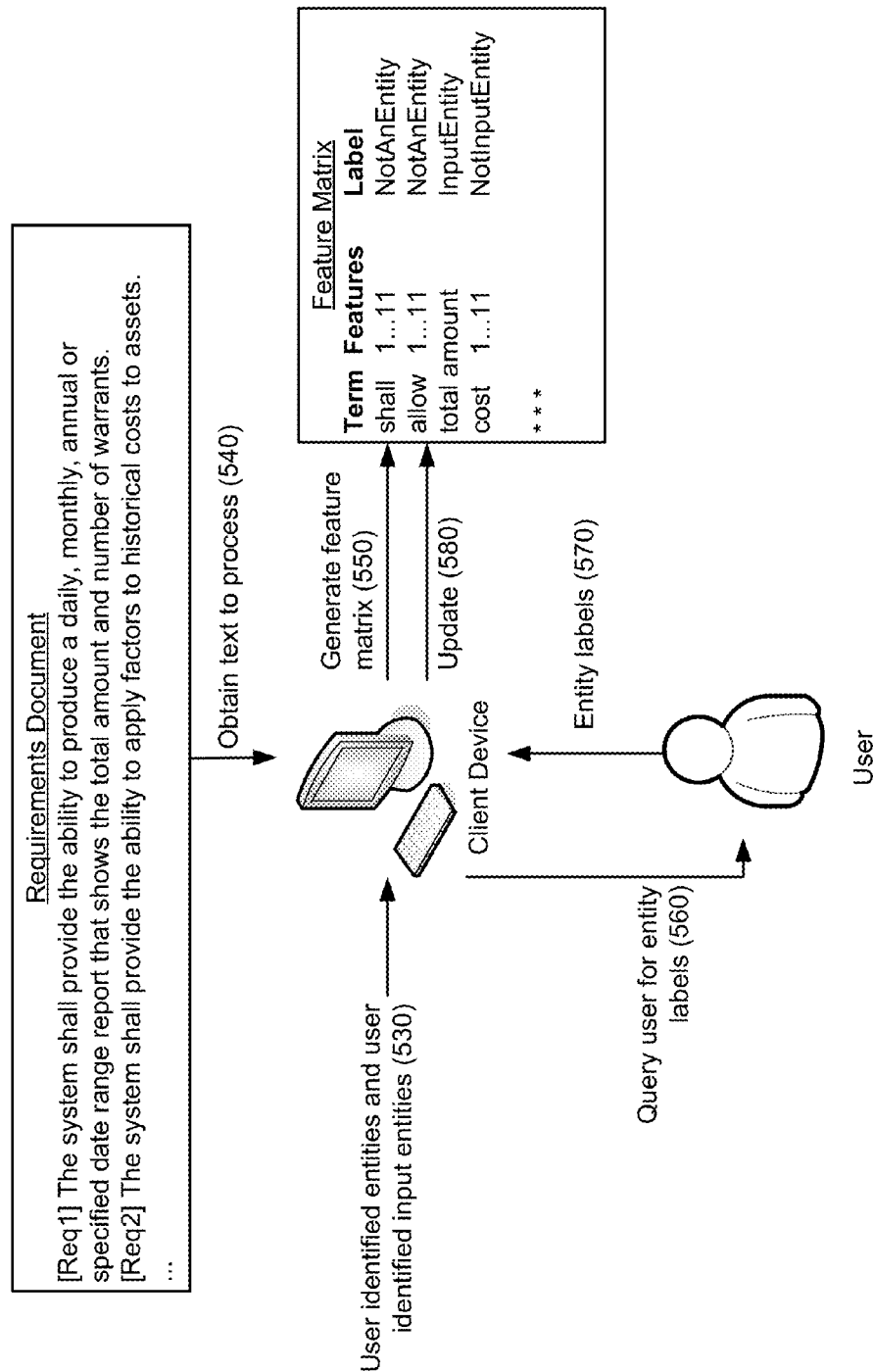
Figure 5C:
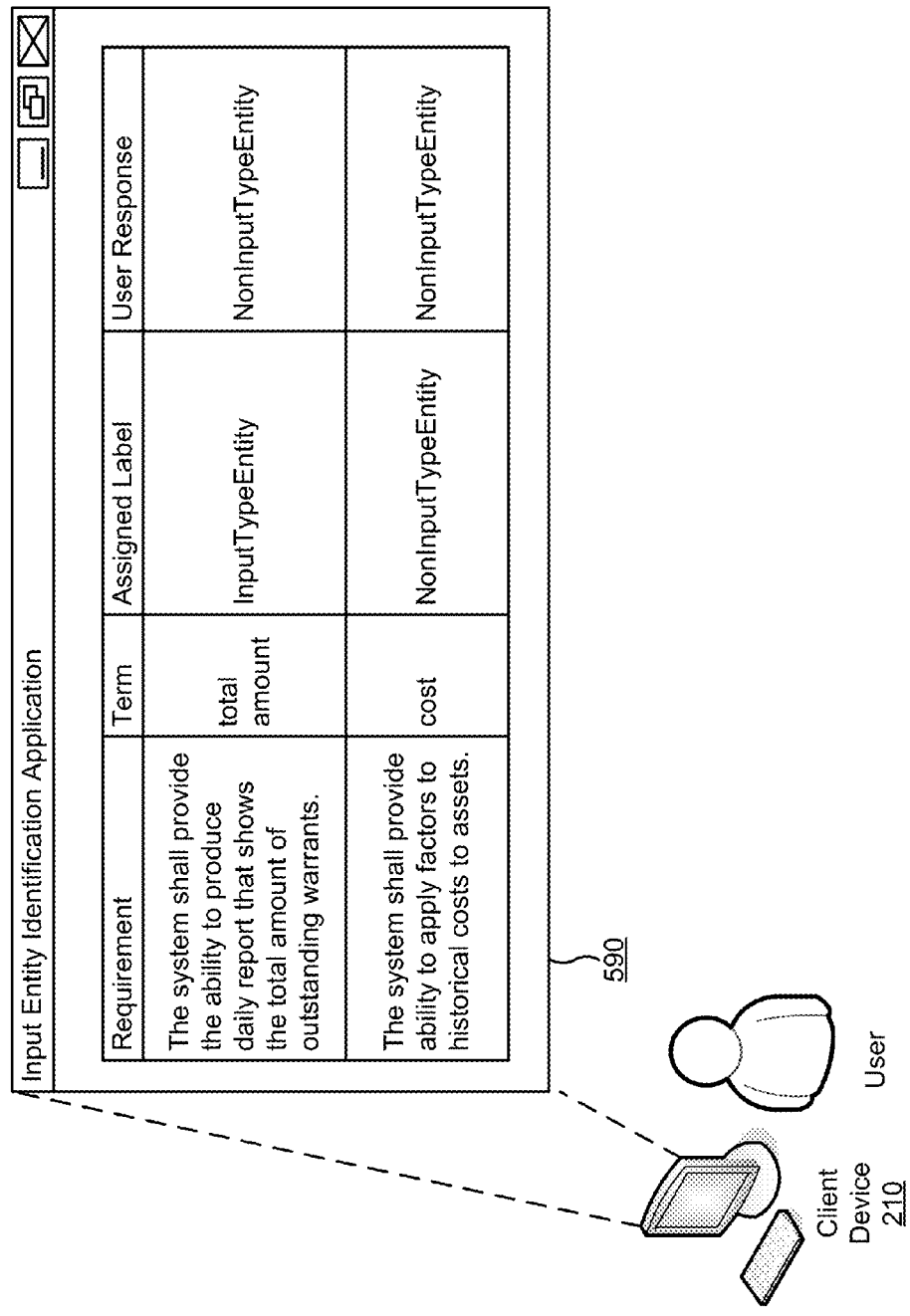

FIGS. 5A-5C are diagrams of an example implementation 500 relating to example process 400 shown in FIG. 4. FIGS. 5A-5C show an example of preparing text for processing and identifying input entities included in the text.

As shown in FIG. 5A, and by reference number 510, assume that client device 210 provides (e.g., for display) an input entity identification application via which a user may specify options to be applied by client device 210 when identifying input entities included in text. As shown, the user may provide input identifying text to process (e.g., one or more text documents, such as a requirements document entitled "Requirements.doc"), may provide input identifying known entities (e.g., known by the user) included in the text (e.g., Entity 1, Entity 2, or the like), may provide input identifying known input entities (e.g., known by the user) included in the text (e.g., Input entity 1, Input entity 2, or the like), may provide input identifying a glossary to be used to identify terms in the text or to be used when analyzing the text sections (e.g., to determine term definitions, synonyms, antonyms, etc.), or the like.

Additionally, or alternatively, the user may provide input identifying other options for processing the text and/or providing output based on processing the text, such as input that indicates whether to provide performance of the model associated with input entity identification for display, input that indicates whether to provide the precision, associated with input entity classifications by the model, for display, input that indicates whether to provide the recall, associated with input entity classifications by the model, for display, input that indicates a manner in which output information is to be provided for display, or the like. As shown by reference number 520, when the user has finished specifying options for processing the text, the user may interact with an input mechanism (e.g., a button, a link, etc.) to cause client device 210 to identify the input entities included in the text.

As shown in FIG. 5B, client device 210 processes the text based on the user interaction. As shown by reference number 530, client device 210 receives the user identified entities and the user identified input entities, provided by the user as described above in connection with FIG. 5A. As shown by reference number 540, client device 210 obtains the text to be processed based on a text document identified by the user. As shown, assume that the text is a text document entitled "Requirements.doc," and that client device 210 identifies the following requirements (among others) in the text document:

[Req1] The system shall provide the ability to produce a daily, monthly, annual or specified date range report that shows the total amount and number of warrants.

[Req2] The system shall provide the ability to apply factors to historical costs to assets.

Assume that the above requirements are included in separate text sections, such as separate sentences and/or paragraphs. Further, assume that client device 210 processes the text document to generate a list of unique terms, to extract features associated with the unique terms, and to determine entity labels for the unique terms. As shown by reference number 550, client device 210 processes the list of unique terms to generate a feature matrix. As shown, assume that client device 210 determines the following terms, and entity labels for the terms, from the above requirements:

| Term | Label |
| --- | --- |
| 1. shall | NotAnEntity |
| 2. allow | NotAnEntity |
| 3. total amount | InputEntity |
| 4. cost | NotInputEntity |

As shown by reference number 560, assume that client device 210 queries a user for entity labels for a portion of the terms provided in the feature matrix. As shown by reference number 570, assume that the user provides the entity labels requested by client device 210. As shown by reference number 580, client device 210 updates the feature matrix based on the entity labels provided by the user. By generating the list of unique terms and/or the feature matrix, client device 210 may identify input entities in the text more efficiently than if the input entities were identified without first creating the list of unique terms and/or the feature matrix.

As shown in FIG. 5C, and by reference number 590, client device 210 requests the user to provide entity labels for particular terms (e.g., "total amount" and "cost") provided in two different text sections or requirements. As shown, client device 210 may assign an "InputTypeEntity" label to the term "total amount" and may assign a "NonInputTypeEntity" label to the term "cost." As further shown, and in contrast to the assigned label, the user may provide a "NonInputTypeEntity" label to the term "total amount." As further shown, and in agreement with the assigned label, the user may provide a "NonInputTypeEntity" label to the term "cost."

As indicated above, FIGS. 5A-5C are provided merely as an example. Other examples are possible and may differ from what was described with regard to FIGS. 5A-5C.

Figure 6:
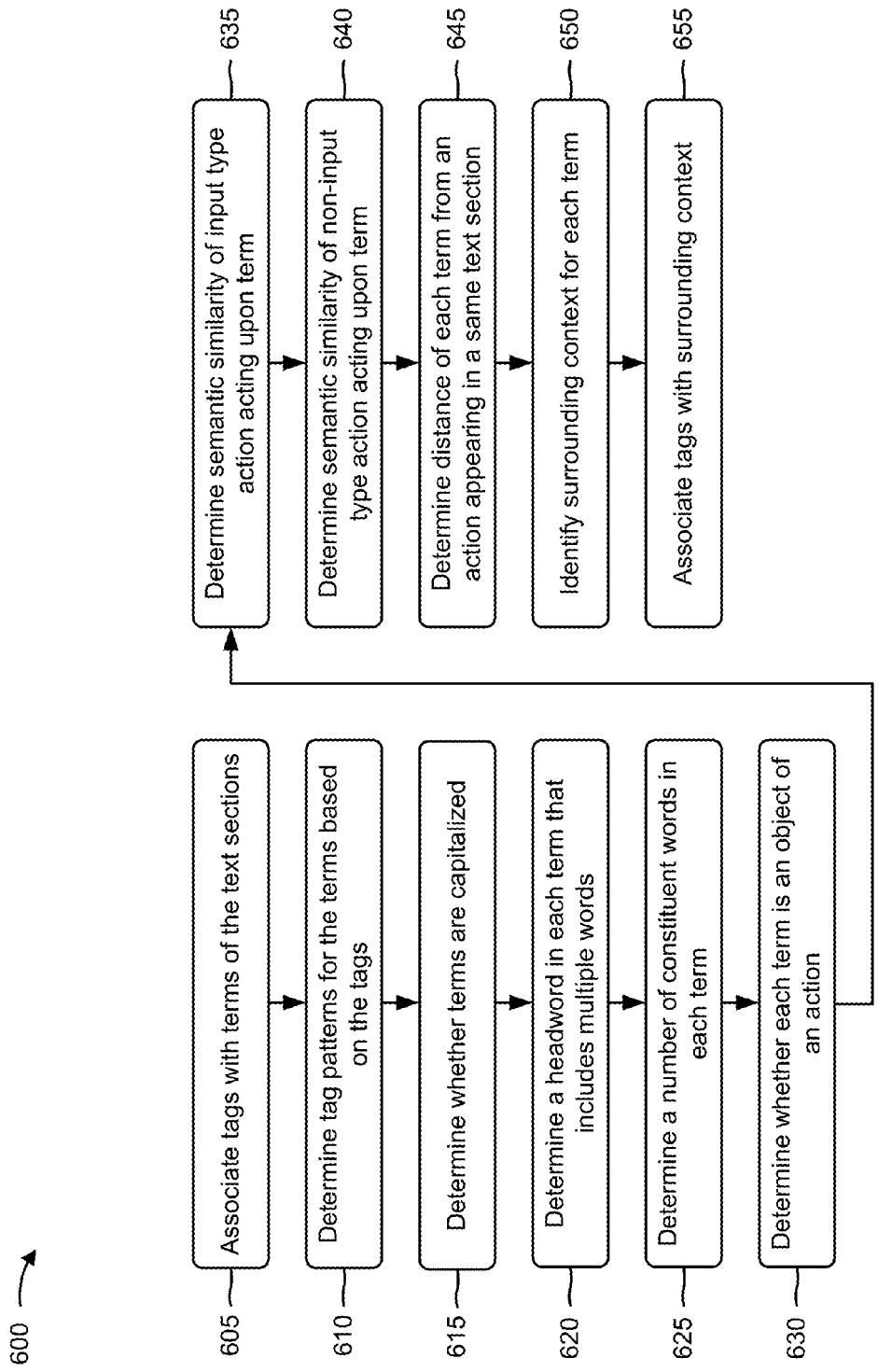
FIG. 6 is a flow chart of an example process for extracting features from natural language text information in order to identify input entities in the natural language text information.

FIG. 6 is a flow chart of an example process 600 for extracting features from natural language text information in order to identify input entities in the natural language text information. In some implementations, one or more process blocks of FIG. 6 may be performed by client device 210. In some implementations, one or more process blocks of FIG. 6 may be performed by another device or a group of devices separate from or including client device 210, such as server device 220.

As shown in FIG. 6, process 400 may include associating tags with terms in the text sections (block 605). For example, client device 210 may receive information that identifies one or more tags, and may associate the tags with terms in the text based on tag association rules. In some implementations, client device 210 may associate the tags with the terms in order to extract a feature (e.g., a first feature, referred to herein as F1) for the terms. The tag association rules may specify a manner in which the tags are to be associated with the terms, based on characteristics of the terms. For example, a tag association rule may specify that a singular noun tag ("/NN") is to be associated with terms that are singular nouns (e.g., based on a language database, a context analysis, etc.).

A word may refer to a unit of language that includes one or more characters. A word may include a dictionary word (e.g., "gas") or may include a non-dictionary string of characters (e.g., "asg"). In some implementations, a word may be a term. Alternatively, a word may be a subset of a term (e.g., a term may include multiple words). Client device 210 may determine words in the text by determining characters identified by one or more delimiting characters, such as a space, a punctuation mark (e.g., a comma, a period, an exclamation point, a question mark, etc.), or the like.

As an example, client device 210 may receive a list of part-of-speech tags (POS tags) and tag association rules for tagging terms in the text with the POS tags based on the part-of-speech of the term. Example part-of-speech tags include NN (noun, singular or mass), NNS (noun, plural), NNP (proper noun, singular), NNPS (proper noun, plural), VB (verb, base form), VBD (verb, past tense), VBG (verb, gerund or present participle), VBP (verb, non-third person singular present tense), VBZ (verb, third person singular present tense), VBN (verb, past participle), RB (adverb), RBR (adverb, comparative), RBS (adverb, superlative), JJ (adjective), JJR (adjective, comparative), JJS (adjective, superlative), CD (cardinal number), IN (preposition or subordinating conjunction), LS (list item marker), MD (modal), etc.

In some implementations, client device 210 may further process the tagged text to associate additional or alternative tags with groups of terms that meet certain criteria. For example, client device 210 may associate an entity tag (e.g., ENTITY) with noun phrases (e.g., consecutive words with a noun tag, such as /NN, /NNS, /NNP, /NNPS, etc.), may associate a term tag (e.g., TERM) with unique terms (e.g., single-word terms, multi-word terms, etc.). In some implementations, client device 210 may only process terms with particular tags, such as noun tags, entity tags, verb tags, term tags, etc., when classifying terms in the text.

In some implementations, client device 210 may utilize a POS tagging process (e.g., an OpenNLP POS tagging process) to associate each term with a tag identifying a grammatical role of the term in the text section (e.g., a sentence). Then client device 210 may associate tags with multi-word entity phrases or multi-word input entity phrases, such that constituent words may be joined using an encoding technique. For example, assume that the text section includes: "The registration system shall allow users to enter details of invoice receipt date." In such an example, the POS tags may include: Registration(NN), system(NN), shall(MD), allow (VB), users(NNS), to(TO), enter(VB), details(NNS), of(IN), invoice(NN), receipt(NN), and date(NN). The encoding for the entity phrases and input entity phrases may include: Registration_system(NN_NN), shall(MD), allow(VB), users(NNS), to(TO), enter(VB), details(NNS), of(IN), and invoice_receipt_date(NN_NN_NN).

As further shown in FIG. 6, process 600 may include determining tag patterns for the terms based on the tags (block 610). For example, client device 210 may determine tag patterns for the terms based on the tags. In some implementations, client device 210 may determine whether the terms satisfy particular tag patterns (e.g., regular expression tag patterns) in order to extract a feature (e.g., a second feature, referred to herein as F2) for the terms. In some implementations, client device 210 may assign a feature value of "1" or "True (T)" if the term satisfies a particular tag pattern, and may assign a feature value of "0" or "False (F)" if the term fails to satisfy the particular tag pattern. For example, the particular tag pattern (e) may be expressed as e={'(DT)*(JJ)*(NN|NNP|NNS|NNPS)+'}. Based upon the tags associated with a text section (e.g., Registration_system (NN_NN) shall(MD) allow(VB) users(NNS) to(TO) enter (VB) details(NNS) of(IN) invoice_receipt_date (NN_NN_NN)), client device 210 may assign feature values as follows: Registration_system(T) shall(F) allow(F) users (T) to(F) enter(F) details(T) of(F) invoice_receipt_date(T).

As further shown in FIG. 6, process 600 may include determining whether the terms are capitalized (block 615). For example, client device 210 may determine whether the terms are capitalized. In some implementations, client device 210 may determine whether the terms are capitalized in order to extract a feature (e.g., a third feature, referred to herein as F3) for the terms. In some implementations, client device 210 may assign a feature value of "1" or "True (T)" if the term satisfies particular conditions, and may assign a feature value of "0" or "False (F)" if the term fails to satisfy the particular conditions. For example, the particular conditions (C) may include: (1) that a term consists of all uppercase letters; or (2) that a first letter of a term or constituent words of a term include uppercase letters (e.g., a first word of a sentence, Tax_Id, Date, or the like). For the text section (e.g., Registration_system shall allow users to enter details of invoice_receipt_date), client device 210 may assign feature values as follows:

Registration_system(T) shall(F) allow(F) users(F) to(F) enter(F) details(F) of(F) invoice_receipt_date(F).

As further shown in FIG. 6, process 600 may include determining a headword in each term that includes multiple words (block 620). For example, client device 210 may determine a headword in each term that includes multiple words. A headword may include a semantically most important word in a phrase. In some implementations, client device 210 may determine a headword in each term that includes multiple words in order to extract a feature (e.g., a fourth feature, referred to herein as F4) for the terms. For example, for the term "invoice_number," client device 210 may determine "number" to be the headword. In another example, for the term "payment_voucher," client device 210 may determine "voucher" to be the headword. For the text section (e.g., Registration_system shall allow users to enter details of invoice_receipt_date), client device 210 may determine headwords as follows: Registration_system(system) shall(shall) allow(allow) users(users) to(to) enter(enter) details(details) of(of) invoice_receipt_date(date).

As further shown in FIG. 6, process 600 may include determining a number of constituent words in each term (block 625). For example, client device 210 may determine a number of constituent words in each term. In some implementations, client device 210 may determine the number of constituent words in each term in order to extract a feature (e.g., a fifth feature, referred to herein as F5) for the terms. In some implementations, client device 210 may determine that terms identifying entities generally do not include more than five constituent words. In one example, for the text section (e.g., Registration_system shall allow users to enter details of invoice_receipt_date), client device 210 may determine constituent words as follows: Registration_system(2) shall(1) allow(1) users(1) to(1) enter (1) details(1) of(1) invoice_receipt_date(3).

In some implementations, client device 210 may perform one or more operations that may be used to extract one or more features for the terms. In some implementations, client device 210 may generate a co-occurrence data structure that indicates a frequency count of terms included in the list of unique terms. For example, client device 210 may generate a term co-occurrence matrix C of size t×d (e.g., with t rows and d columns), where t is equal to the number of unique terms in the text (e.g., where unique terms list TermList (T)=[$term_1$, $term_2$, . . . , $term_t$]), and where d is equal to the number of unique text sections (e.g., requirements) in the text (e.g., where unique requirements list D=[$Req_1$, $Req_2$, . . . , $Req_d$]). The co-occurrence matrix C may store an indication of a quantity of times that each term appears in each text section (e.g., in each sentence, where a requirement is a sentence). For example, a value stored at C[i, j] may represent a quantity of times that the i-th term (e.g., $term_i$ from the TermList) is included in the j-th text section (e.g., $Req_j$ from D).

A single row in co-occurrence matrix C may be referred to as a term vector, and may represent a frequency of occurrence of a single term in each text section. A single column in co-occurrence matrix C may be referred to as a text section vector, and may represent the frequency of occurrence of each term, included in the list of unique terms TermList, in a single text section.

In some implementations, client device 210 may prepare the co-occurrence data structure for processing by applying information theoretic weighting to adjust the values in matrix C. In this case, client device 210 may determine an inverse document frequency (idf) factor corresponding to a particular term (e.g., row) and text section (e.g., column) based on the total number of text sections d and the number of text sections in which the term appears. For example, client device 210 may determine the idf factor for a particular term and text section by dividing the total number of text sections d by the number of text sections in which the term appears, and by taking a logarithm of that quotient. In some implementations, client device 210 may apply information theoretic weighting to adjust the values of the co-occurrence matrix as follows:

$$C[i, j] = C[i, j] \times \ln\left(\frac{d}{n_i + 1}\right),$$

for each i in [1 . . . t] and each j in [1 . . . d], where C[i, j] represents the co-occurrence matrix value (e.g., a frequency quantity) for a particular term in a particular text section, d represents the total number of text sections, and $n_i$ represents the number of text sections that include $term_i$.

In some implementations, when client device 210 determines that latent semantic indexing is to be performed, client device 210 may generate a low-rank approximation of the co-occurrence matrix (e.g., an approximation matrix U) with the adjusted values (e.g., may map co-occurrence matrix C to a lower dimensional semantic space). For example, client device 210 may apply singular value decomposition (SVD) to co-occurrence matrix C, to determine matrices U, Σ, and $V^T$, such that:

$$C = U\Sigma V^T,$$

where C represents the co-occurrence matrix (e.g., with or without the merged rows and/or with or without the adjusted values), U represents a t×t unitary matrix, represents a t×d rectangular diagonal matrix with nonnegative real numbers on the diagonal, and $V^T$ (the conjugate transpose of V) represents a d×d unitary matrix. The diagonal values of Σ (e.g., $\Sigma_{i,i}$) may be referred to as the singular values of matrix C.

Client device 210 may determine a truncation value k for reducing the size of matrix U so that matrix U retains 90% variance in matrix C, which may be useful for calculating a latent semantic similarity score for two terms. In some implementations, client device 210 may determine truncation value k by assuming that $\sigma_1$, $\sigma_2$, . . . , $\sigma_d$ are eigenvalues along the diagonal of Σ, and selecting top k eigenvalues from Σ (along the diagonal) so that:

$$\frac{\sigma_1^2 + \sigma_2^2 + \ldots + \sigma_k^2}{\sigma_1^2 + \sigma_2^2 + \ldots + \sigma_d^2} \geq 0.90.$$

In some implementations, client device 210 may determine a quantity of non-zero singular values (e.g., the quantity of non-zero entries in Σ), which may be referred to as the rank r of matrix C, and may set the truncation value k equal to the rank r of matrix C. Alternatively, client device 210 may set the truncation value k equal to $(t \times d)^{0.2}$. In some implementations, client device 210 may set the truncation value k as follows:

If $(t \times d)^{0.2} < r$, then $k = (t \times d)^{0.2}$, Otherwise, $k = r$.

Client device 210 may truncate the matrix U by removing columns from U that are not included in the first k columns (e.g., the truncated matrix U may only include columns 1 through k of the original matrix U). The rows in truncated matrix U may correspond to term vectors in the latent semantic indexing (LSI) space. In some implementations, the lower dimensional latent semantic space may reflect semantic associations present within the text between the terms, and semantically closer terms may map to closer locations in the lower dimensional latent semantic space.

In some implementations, client device 210 may determine a latent semantic similarity between two terms by calculating a cosine of the angle between the term vectors in the truncated matrix U. For example, if U[i] and U[j] are the reduced term vectors from the matrix U corresponding to the i-th and j-th terms, the latent semantic similarity (LSS) between the terms may be calculated as follows:

$$LSS[i, j] = \frac{\sum_{l=1}^{l=n} U[i, l] U[j, l]}{\sqrt{\sum_{l=1}^{l=k} U[i, l]^2} \sqrt{\sum_{l=1}^{l=k} U[j, l]^2}}$$

The latent semantic similarity may include a value from −1 to +1, where a value of −1 may indicate that the terms are antonyms, a value of 0 may indicate that the terms are statistically independent, and a value of +1 may indicate that the terms are synonyms (e.g., completely similar to each other in usage).

As further shown in FIG. 6, process 600 may include determining whether each term is an object of an action (block 630). For example, client device 210 may determine whether each term is an object of an action. In some implementations, client device 210 may determine whether each term is an object of an action in order to extract a feature (e.g., a sixth feature, referred to herein as F6) for the terms. In some implementations, client device 210 may assign a value of "1" to a term in a text section if the term is a noun phrase and there exists some action phrase (e.g., a verb or a verb phrase) in the text section that acts upon the term (e.g., the term is an object of the action phrase as per a dependency graph, such as a direct object, an indirect object, or a propositional object). Otherwise, client device 210 may assign a value of "0" to the term. In one example, for the text section (e.g., Registration_system shall allow users to enter details of invoice_receipt_date), client device 210 may determine whether each term is an object of an action as follows: Registration_system(0) shall(0) allow(0) users(0) to(0) enter(0) details(1) of(0) invoice_receipt_date (1).

In some implementations, client device 210 may determine whether each term is an object of an action by extracting a subject-predicate-object relationship from a text section, which can be achieved using a dependency parser analysis (e.g., applying ClearNLP parser analysis). Alternatively, or additionally, client device 210 may determine whether each term is an object of an action by applying the following heuristic in a text section (S) with terms (t):

---

Initially F6(t) = 0
If t is not a noun phrase, return F6(t)
Scan S towards the left of t to locate an action term (V), until the beginning of S:
    If V is in passive voice (e.g., V is past tense--ends with "ed" or "ied")
        Go to [R]
    Else (e.g., V is active voice) return F6(t) = 1
[R] Scan S towards the right of t to find an action term V, until the end of S:
    If V is in passive voice, return F6(t) = 1.

---

In one example, for the text section (e.g., Registration_system shall allow users to enter details of invoice_receipt_date), client device 210 may determine whether each term is an object of an action as follows: Registration_system(0) shall(0) allow(0) users(1) to(0) enter(0) details(1) of(0) invoice_receipt_date(1). Note that the term "users" is assigned feature value of 1 since the term is preceded by action (e.g., "allow"), even though semantically the term is not an object of "allow."

As further shown in FIG. 6, process 600 may include determining a semantic similarity of an input type action acting upon a term (block 635). For example, client device 210 may determine a semantic similarity of an input type action acting upon a term. In some implementations, client device 210 may determine a semantic similarity of an input type action acting upon a term in order to extract a feature (e.g., a seventh feature, referred to herein as F7) for the terms. In some implementations, client device 210 may determine a semantic similarity of an action term that is acting upon a term with a particular type of verb (e.g., from a list of input type verbs provided to client device 210), and the more an action term is an input type action, the greater a semantic similarity of the action term. In some implementations, client device 210 may determine a semantic similarity of an input type action acting upon a term by applying the following heuristic in a text section (S) with terms (t):

---

If t is a noun phrase and F6(t) ≠ 1
    Let V in S be an action term for which t is a dependent object
    F7(t) = maximum of the latent semantic similarity of V with input type verbs
    from the list which are present in the LSS space of the text section
Else F7(t) = undefined.

---

As further shown in FIG. 6, process 600 may include determining a semantic similarity of a non-input type action acting upon a term (block 640). For example, client device 210 may determine a semantic similarity of a non-input type action acting upon a term. In some implementations, client device 210 may determine a semantic similarity of a non-input type action acting upon a term in order to extract a feature (e.g., an eighth feature, referred to herein as F8) for the terms. In some implementations, client device 210 may determine a semantic similarity of a non-input type action acting upon a term by applying the following heuristic in a text section (S) with terms (t):

---

If t is a noun phrase and F6(t) ≠ 1
   Let V in S be an action term for which t is a dependent object
   F8(t) = maximum of the latent semantic similarity of V with non-input type verbs
   which are present in the LSS space of the text section
Else F8(t) = undefined.

---

In some implementations, an action term may be considered as non-input type if the action term does not occur in the list of input type verbs and does not have a latent semantic similarity of more than 0.9 with any of the verbs in the list.

As further shown in FIG. 6, process 600 may include determining a distance of each term from an action appearing in a same text section (block 645). For example, client device 210 may determine a distance of each term from an action appearing in a same text section. In some implementations, client device 210 may determine a distance of each term from an action appearing in a same text section in order to extract a feature (e.g., a ninth feature, referred to herein as F9) for the terms. In some implementations, client device 210 may determine a distance of each term from an action appearing in a same text section by applying the following heuristic in a text section (S) with terms (t):

---

If t is a noun phrase and F6(t) ≠ 1
   Let V in S be an action term for which t is a dependent object
   F9(t) = a number of terms between t and v (including t and excluding v)
Else F9(t) = 0.

---

In one example, for the text section (e.g., Registration_system shall allow users to enter details of invoice_receipt_date), client device 210 may determine a distance of each term from an action appearing in the text section as follows: Registration_system(0) shall(0) allow(0) users(0) to(0) enter (0) details(1) of(0) invoice_receipt_date(3). Note that the term "Registration_system" is a subject type, and is assigned a feature value of 0. On the other hand, the term "details" is a dependent object of the action "enter" and the term "invoice_receipt_date" is a prepositional object of the action "enter," and are assigned feature values of 1 and 3, respectively.

As further shown in FIG. 6, process 600 may include identifying surrounding context for each term (block 650). For example, client device 210 may identify surrounding context for each term. In some implementations, client device 210 may identify surrounding context for each term in order to extract a feature (e.g., a tenth feature, referred to herein as F10) for the terms. In some implementations, according to distributional semantics of natural language, terms occurring in similar contexts tend to have similar meanings. Thus, surrounding context may be used as a discriminating feature for a term. In some implementations, client device 210 may define a particular context window size (N) that indicates that N terms to the left of a term and N terms to the right of the term are used as a feature for the term. In one example, for the text section (e.g., Registration_system shall allow users to enter details of invoice_receipt_date) and for a context window size of N=2, client device 210 may identify surrounding context for each term as follows:

| Term | Context |
|---|---|
| Registration_system | {"shall", "allow"} |
| users | {"shall", "allow", "to", "enter"} |
| invoice_receipt_date | {"details", "of"}. |

As further shown in FIG. 6, process 600 may include associating tags with the surrounding context for each term (block 655). For example, client device 210 may associate tags with the surrounding context for each term. In some implementations, client device 210 may associate tags with the surrounding context for each term in order to extract a feature (e.g., an eleventh feature, referred to herein as F11) for the terms. In some implementations, the tags may include POS tags. In one example, for the text section (e.g., Registration_system shall allow users to enter details of invoice_receipt_date) and for a context window size of N=2, client device 210 may associate tags with the surrounding context for each term as follows:

| Term | Context Tag |
|---|---|
| Registration_system | {MD, VB} |
| users | {MD, VB, TO, VB} |
| invoice_receipt_date | {NNS, IN}. |

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A and 7B are diagrams of an example implementation 700 relating to example process 600 shown in FIG. 6. FIGS. 7A and 7B shows example output based on extracting features from text information in order to identify input entities in the text information.

As shown in FIGS. 7A and 7B, assume that client device 210 has received text that includes a text section 710, and has extracted features for the terms included in text section 710. Text section 710 may include the syntax "Registration system shall allow users to enter details of invoice receipt date." Further, assume that client device 210 has generated a feature matrix 720 based on text section 710 and based on extracting features for the terms included in text section 710.

As shown, feature matrix 720 includes a term column that lists the terms included in text section 710. For example, the term column lists the terms "Registration_system," "shall," "allow," "users," "to," "enter," "details," "of" and "invoice_receipt_date." Feature matrix 720 also includes columns associated with the features (e.g., F1 through F11) described above in connection with FIG. 6, and rows associated with the terms provided in the term column. For example, feature matrix 720 indicates that the term "Registration_system" is associated with the following features (shown in parentheses): NN_NN (F1), True-T (F2), True-T (F3), system (F4), 2 (F5), 0 (F6), 0 (F7), 0 (F8), 0 (F9), {shall, allow} (F10), and {MD, VB} (F11). Feature matrix 720 provides similar information for the other terms of text section 710.

As further shown in FIG. 7B, feature matrix 720 includes a label column that identifies an entity label assigned to the terms of text section 710 by client device 210. For example, the label column of feature matrix 720 indicates that the terms "Registration_system," "shall," "users," "to," "enter," "details," and "of" are not entities and are assigned "notA-nEntity" labels. The label column of feature matrix 720 also indicates that the terms "allow" and "invoice_receipt_date" are input entities and are assigned "InputTypeEntity" labels.

As further shown in FIG. 7B, feature matrix 720 may include a confidence (Conf.) column that identifies a confidence level associated with the entity labels assigned in the label column. In some implementations, client device 210 may calculate the values provided in the confidence column based on the features extracted from text section 710 (e.g., as shown in feature columns F1 through F11), and may utilize the values to determine whether to request user input for an entity label. For example, since the confidence level associated with the entity label assigned to the term "Registration_system" is only 0.5, client device 210 may request that the user verify that the term "Registration_system" is not an entity.

As indicated above, FIGS. 7A and 7B are provided merely as an example. Other examples are possible and may differ from what was described with regard to FIGS. 7A and 7B.

Implementations described herein may utilize natural language processing and feature extraction to identify input entities included in text, thereby increasing the speed and accuracy of input entity identification.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive text to be processed to identify input entities included in the text;
identify text sections of the text;
generate a list of terms included in the text sections of the text;
perform a feature extraction technique to determine whether each term, in the list of the terms, is an object of an action,
the feature extraction technique causing a subject-predicate-object relationship to be extracted from one of the text sections;
perform one or more other feature extraction techniques, on the terms included in the text sections, to identify the input entities included in the text,
the one or more other feature extraction techniques including at least one of:
a technique to determine tag patterns for the terms based on tags associated with the terms,
a technique to determine whether the terms are capitalized, a technique to determine a headword in each term than includes multiple words,
a technique to determine a number of constituent words in each term,
a technique to determine semantic similarities of input type actions acting on the terms,
a technique to determine semantic similarities of non-input type actions acting on the terms, the non-input type actions acting on the terms being action terms that are not in the list of terms,
a technique to determine a distance of each term from an action appearing in a same text section associated with each term, or
a technique to identify surrounding context for each term and associated tags with the surrounding context;
generate information that identifies the input entities included in the text, based on performing the feature extraction technique and the one or more other feature extraction techniques; and
provide the information that identifies the input entities included in the text.

2. The device of claim 1, where the one or more processors, when performing the one or more other feature extraction techniques, are to:
generate a term co-occurrence matrix based on the terms and the text sections;
apply information theoretic weighting to adjust values in the term co-occurrence matrix;
generate an approximation matrix of the term co-occurrence matrix with the adjusted values;
truncate the approximation matrix; and
determine a latent semantic similarity between two terms by calculating a cosine of an angle between term vectors, associated with the two terms, in the truncated approximation matrix.

3. The device of claim 1, where the one or more processors, when generating the information that identifies the input entities included in the text, are to:
generate a feature data structure that includes:
the list of the terms included in the text sections,
information identifying features associated with the terms and generated by the feature extraction technique and the one or more other feature extraction techniques,
information identifying entity labels associated with the terms and generated based on the features, and
information identifying confidence levels associated with the entity labels and generated based on the features.

4. The device of claim 3, where each of the entity labels includes one of:
a label indicating that a corresponding term is not an entity,
a label indicating that a corresponding term is not an input entity, or
a label indicating that a corresponding term is an input entity.

5. The device of claim 3, where the one or more processors are further to:
provide a query to a user requesting entity labels for a portion of the terms included in the feature data structure;
receive, based on the query and from the user, the entity labels for the portion of the terms included in the data structure; and
update the feature data structure based on the received entity labels for the portion of the terms.

6. The device of claim 1, where the one or more processors are further to:
receive information associated with processing the text;
process the text based on the information associated with processing the text;
receive user identified entities and user identified input entities; and
identify terms, included in the text sections of the text, as potential entities or potential input entities based on the user identified entities and the user identified input entities.

7. The device of claim 1, where the one or more processors are further to:
provide a query to a user requesting entity identification for a portion of the terms;
receive, based on the query and from the user, the entity identification for the portion of the terms;
update the information that identifies the input entities included in the text, based on the entity identification for the portion of the terms; and
provide the updated information that identifies the input entities included in the text.

8. A non-transitory computer-readable medium storing instructions, the instructions comprising:
one or more instructions that, when executed by one or more processors, cause the one or more processors to:
receive text to be processed to identify input entities included in the text;
identify text sections of the text;
generate a list of terms included in the text sections of the text;
perform a feature extraction technique to determine whether each term, in the list of the terms, is an object of an action,
the feature extraction technique causing a subject-predicate-object relationship to be extracted from one of the text sections;
perform one or more other feature extraction techniques, on the terms included in the text sections, to identify the input entities included in the text;
generate information that identifies the input entities included in the text, based on performing the feature extraction technique and the one or more other feature extraction techniques; and
provide the information that identifies the input entities included in the text.

9. The non-transitory computer-readable medium of claim 8, where the one or more other feature extraction techniques include at least one of:
a technique to determine tag patterns for the terms based on tags associated with the terms;
a technique to determine whether the terms are capitalized;
a technique to determine a headword in each term than includes multiple words;
a technique to determine a number of constituent words in each term;
a technique to determine semantic similarities of input type actions acting on the terms;
a technique to determine semantic similarities of non-input type actions acting on the terms;
a technique to determine a distance of each term from an action appearing in a same text section associated with each term; or a technique to identify surrounding context for each term and associate tags with the surrounding context.

10. The non-transitory computer-readable medium of claim 8, where the one or more instructions, that cause the one or more processors to generate the information that identifies the input entities included in the text, cause the one or more processors to:
generate a feature data structure that includes:
the list of the terms included in the text sections,
information identifying features associated with the terms and generated by the feature extraction technique and the one or more other feature extraction techniques,
information identifying entity labels associated with the terms and generated based on the features, and
information identifying confidence levels associated with the entity labels and generated based on the features.

11. The non-transitory computer-readable medium of claim 10, further comprising:
one or more instructions, that when executed by the one or more processors, cause the one or more processors to:
provide a query to a user requesting entity labels for a portion of the terms included in the feature data structure;
receive, based on the query and from the user, the entity labels for the portion of the terms included in the feature data structure; and
update the feature data structure based on the received entity labels for the portion of the terms.

12. The non-transitory computer-readable medium of claim 10, where each of the entity labels includes one of:
a label indicating that a corresponding term is not an entity,
a label indicating that a corresponding term is not an input entity, or
a label indicating that a corresponding term is an input entity.

13. The non-transitory computer-readable medium of claim 8, further comprising:
one or more instructions, that when executed by the one or more processors, cause the one or more processors to:
receive information associated with processing the text;
process the text based on the information associated with processing the text;
receive user identified entities and user identified input entities; and
identify terms, included in the text sections of the text, as potential entities or potential input entities based on the user identified entities and the user identified input entities.

14. The non-transitory computer-readable medium of claim 8, further comprising:
one or more instructions, that when executed by the one or more processors, cause the one or more processors to:
provide a query to a user requesting entity identification for a portion of the terms;
receive, based on the query and from the user, the entity identification for the portion of the terms;
update the information that identifies the input entities included in the text, based on the entity identification for the portion of the terms; and
provide the updated information that identifies the input entities included in the text.

15. A method, comprising:
receiving, by a device, text to be processed to identify input entities included in the text;
identifying, by the device, text sections of the text;
generating, by the device, a list of terms included in the text sections of the text;
performing, by the device, a feature extraction technique to determine whether each term, in the list of the terms, is an object of an action,
the feature extraction technique causing a subject-predicate-object relationship to be extracted from one of the text sections;
performing, by the device, one or more other feature extraction techniques, on the terms included in the text sections, to identify the input entities included in the text,
the one or more other feature extraction techniques including at least one of:
determining tag patterns for the terms based on tags associated with the terms,
determining whether the terms are capitalized,
determining a headword in each term than includes multiple words,
determining a number of constituent words in each term,
determining semantic similarities of input type actions acting on the terms,
determining semantic similarities of non-input type actions acting on the terms,
the non-input type actions acting on the terms being action terms that are not in the list of terms,
determining a distance of each term from an action appearing in a same text section associated with each term, or
identifying surrounding context for each term and associating tags with the surrounding context;
generating, by the device, information that identifies the input entities included in the text, based on performing the feature extraction technique and the one or more other feature extraction techniques; and
providing, by the device, the information that identifies the input entities included in the text.

16. The method of claim 15, where generating the information that identifies the input entities included in the text comprises:
generating a feature data structure that includes:
the list of the terms included in the text sections,
information identifying features associated with the terms and generated by the feature extraction technique and the one or more other feature extraction techniques,
information identifying entity labels associated with the terms and generated based on the features, and
information identifying confidence levels associated with the entity labels and generated based on the features.

17. The method of claim 16, where each of the entity labels includes one of:
a label indicating that a corresponding term is not an entity,
a label indicating that a corresponding term is not an input entity, or
a label indicating that a corresponding term is an input entity.

18. The method of claim 16, further comprising:
providing a query to a user requesting entity labels for a portion of the terms included in the feature data structure;
receiving, based on the query and from the user, the entity labels for the portion of the terms included in the data structure; and
updating the feature data structure based on the received entity labels for the portion of the terms.

19. The method of claim 15, further comprising:
receiving information associated with processing the text;
processing the text based on the information associated with processing the text;
receiving user identified entities and user identified input entities; and
identifying terms, included in the text sections of the text, as potential entities or potential input entities based on the user identified entities and the user identified input entities.

20. The method of claim 15, further comprising:
providing a query to a user requesting entity identification for a portion of the terms;
receiving, based on the query and from the user, the entity identification for the portion of the terms;
updating the information that identifies the input entities included in the text, based on the entity identification for the portion of the terms; and
providing the updated information that identifies the input entities included in the text.

* * * * *